US008852549B2

(12) United States Patent
Virnig et al.

(10) Patent No.: US 8,852,549 B2
(45) Date of Patent: Oct. 7, 2014

(54) METHOD FOR MAINTAINING THE RATIO OF THE OXIME TO EQUILIBRIUM MODIFIER CONCENTRATION IN SOLVENT EXTRACTION CIRCUITS

(75) Inventors: Michael Virnig, Tucson, AZ (US); Jack Bender, Corona de Tucson, AZ (US); Nathan C. Emmerich, Tucson, AZ (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 13/551,029

(22) Filed: Jul. 17, 2012

(65) Prior Publication Data

US 2013/0020536 A1  Jan. 24, 2013

Related U.S. Application Data

(60) Provisional application No. 61/510,598, filed on Jul. 22, 2011.

(51) Int. Cl.
*B01D 11/00* (2006.01)
*C22B 3/24* (2006.01)

(52) U.S. Cl.
CPC .................................... *C22B 3/24* (2013.01)
USPC ............................. 423/658.5; 423/24

(58) Field of Classification Search
USPC .................................... 423/24, 658.5
See application file for complete search history.

(56) References Cited

U.S. PATENT DOCUMENTS

| 4,507,268 A | 3/1985 | Kordosky et al. |
| 4,544,532 A | 10/1985 | Kordosky et al. |
| 4,978,788 A | 12/1990 | Dalton et al. |
| 5,176,843 A | 1/1993 | Dalton et al. |
| 5,281,336 A | 1/1994 | Dalton et al. |
| 5,879,556 A | 3/1999 | Hein |
| 6,113,804 A | 9/2000 | Dalton et al. |
| 6,177,055 B1 | 1/2001 | Virnig et al. |
| 6,231,784 B1 | 5/2001 | Virnig et al. |
| 6,726,887 B1 | 4/2004 | Sugarman et al. |
| 7,025,899 B2 | 4/2006 | Sudderth et al. |
| 7,309,474 B2 | 12/2007 | Soderstrom |
| 2004/0258590 A1 | 12/2004 | Kordosky et al. |

FOREIGN PATENT DOCUMENTS

WO   WO-2008/088473   7/2008

OTHER PUBLICATIONS

"European Search Report of 11174988.3", dated Nov. 28, 2011, 4 pgs.
Kordosky, Gary et al., "Equilibrium Copper Strip Points as a Function of Temperature and Other Operating Parameters: Implications for Commercial Copper Solvent Extraction Plants", *Tsinghua Science and Technology*, vol. 11, No. 2 2006, pp. 160-164.

*Primary Examiner* — Steven Bos
(74) *Attorney, Agent, or Firm* — Melanie L. Brown

(57) ABSTRACT

Provided are methods for maintaining the ratio of the oxime to equilibrium modifier concentration in solvent extraction circuits, said solvents essentially consisting of at least one ketoxime and/or aldoxime; at least one equilibrium modifier; and at least one diluent.

20 Claims, 2 Drawing Sheets

METHOD FOR MAINTAINING THE RATIO OF THE OXIME TO EQUILIBRIUM MODIFIER CONCENTRATION IN SOLVENT EXTRACTION CIRCUITS

CROSS REFERENCE PARAGRAPH

This application claims priority to U.S. Provisional Application No. 61/510,598, filed Jul. 22, 2011, the contents of which are hereby incorporated by reference in their entirety.

TECHNICAL FIELD

The present invention generally relates to the area of hydrometallurgy, in particularly to the recovery of metals from aqueous solutions derived from the leaching of metal-bearing ores via solvent extraction and refers to a method for maintaining the relative ratios of the components of the metal extractant formulation in the organic phase over time in operation.

BACKGROUND

In extractive metallurgy, solvent extraction reagent formulations typically comprise oxime extractants, organic diluents, and in some cases, equilibrium modifiers and/or kinetic modifiers.

In order to operate a plant for the recovery of a metal such as copper from an ore by leaching-solvent extraction-electrowinning under optimal conditions, one generally first has to define the leaching conditions required to bring the copper metal values into an aqueous solution. Depending on the nature and grade of the ore, the resultant leach solution will contain a certain amount of, for example, copper within a certain concentration range. It will also contain a certain concentration range of residual leaching reagent, typically sulfuric acid in the case of copper. It will also contain various other metals like for example iron, magnesium, and aluminum as the sulfate. In selecting the optimum extractant and extractant concentration to use for recovery of the copper values from the leach solution, one needs to also take into consideration things such as the stripping conditions which in turn are going to be determined by how one wants to operate the tank house, the desired recovery of metal from the leach solution, the circuit configuration (number of extraction stages and stripping stages available depending on capital constraints of the project) as well as the nature of the leach solution. Proper selection of the optimum extractant is important to insure maximum profitability.

Once the reagent has been selected, it is added to the circuit as initial fill and additional fresh reagent is added as required to maintain the optimum reagent concentration over time. A certain amount of reagent is lost overtime as either entrainment of the organic phase in the exiting aqueous raffinate or by chemical degradation of the oxime necessitating the addition of fresh reagent to the organic to maintain the desired reagent concentration.

Aldoximes are strong extractants which are difficult to strip resulting in relatively poor net copper transfer in a circuit under typical operating conditions. Ketoximes are weak extractants which are very readily stripped resulting in very good net copper transfer in a circuit under typical operating conditions. The variation of the amount of ketoxime relative to aldoxime in the reagent formulation results in extractant formulations having different extractive strengths allowing the performance to be tailored to a particular application as disclosed for example in U.S. Pat. No. 4,507,268 and U.S. Pat. No. 4,544,532. Examples of non-modified ketoxime/aldoxime blends having a range of extractive strengths are LIX® 937N, LIX® 984N, and LIX® 973N As noted above, a drawback of existing processes is the loss of organic reagent due to acid catalyzed hydrolysis, especially at higher temperatures, which leads to the formation of unwanted aldehydes or ketones and the entrainment of organic matter—oximes, modifiers and solvents—into the aqueous phase which exits the process. While ketoximes are somewhat more stable than aldoximes, the differences are not great and one finds that the relative ratios of ketoxime to aldoxime in the circuit organic remain relatively close to that of fresh reagent over time under typical plant operating temperatures and acid concentrations in the feed solution and electrolyte. Addition of fresh reagent maintains the overall balance of the extractant composition in the circuit organic very close to the optimum.

In the case of modified oximes, the situation can be quite different. As explained above, aldoximes are strong extractants that are very difficult to strip under typical operating conditions and as a result are not typically used by themselves. The relative extractive strength of an aldoxime can be varied by mixing it with different amounts of equilibrium modifiers such as described in U.S. Pat. Nos. 4,978,788; 5,176,843; 5,281,336; 6,113,804; 6,726,887, 6,177,055 and 6,231,784. Examples for formulated reagent concentrates can be found in U.S. Pat. No. 7,025,899—all these documents hereby incorporated by reference. By varying the amount of aldoxime to modifier in the organic phase, one can vary the extractive strength of the reagent formulation to match the requirements of the particular application.

One can also develop modified ketoxime/aldoxime blends for particular applications as disclosed for example in U.S. Pat. No. 7,309,474. Depending on the nature of the modifier (water solubility, volatility, chemical stability), one can encounter problems with modified aldoximes formulations. Over a period of time in operation, one can find a selective loss of one component of the reagent formulation relative to the other component from the circuit organic. Simply adding the fresh reagent as formulated may not maintain the desired reagent composition in the circuit organic. This is especially problematic in the cases where the modifier is lost at a much slower rate than the oxime due to the fact that the modifier is significantly more chemically stable, less volatile, and less water soluble than the oxime resulting in a buildup of the modifier in the circuit organic relative to the required concentration of the oxime.

TXIB, a branched di-ester (U.S. Pat. No. 4,978,788) and di-n-butyl adipate (U.S. Pat. No. 6,177,055) are currently widely used as equilibrium modifiers. They are characterized as being non-soluble in water, non-volatile and have high chemical stability in the application relative to the oximes. When using one of these di-esters as an equilibrium modifier, one finds that after a period of time, the level of modifier has greatly increased relative to the amount of aldoxime with the effect that the plant is effectively operating with a much weaker extractant than optimum and a higher modifier concentration than necessary resulting in increased viscosity of the organic phase which in turn increases physical problems such as increased aqueous entrainment, increased crud formation, and higher organic losses. It would be highly desirable to be able to adjust the ratios of the extractant components in the circuit organic in a manner that brings the extractant composition in the organic phase back to the optimum formulation initially chosen for the application while maintaining the effective reagent concentration in the desired range.

SUMMARY

One aspect of the invention relates to a method for maintaining a ratio of oxime to equilibrium modifier concentration in solvent extraction circuits, wherein the solvent extraction circuit includes a plant organic comprising a solvent consisting essentially of
(a) at least one ketoxime and/or aldoxime;
(b) at least one equilibrium modifier; and
(c) at least one diluent The method comprises
(i) taking a sample of the plant organic, determining a copper max load and an equilibrated strip point of the plant organic;
(ii) preparing a solution A of said component (a) in (c) to give a copper max load equivalent to that of the plant organic, diluting small portions of the plant organic with solution A, determining a respective equilibrated strip point of each diluted solution and graphing the equilibrated strip point versus the degree of dilution of the plant organic, wherein the degree of dilution of the plant organic is taken as 1, to create a calibration curve;
(iii) preparing a solution of fresh reagent in component (c) having a copper max load (CuML) equivalent to that of the plant organic and determining its equilibrated strip point (EqSP1);
(iv) determining a required dilution factor, D, by extrapolation from the graph using the equilibrated strip point for the fresh reagent (EqSP1);
(v) calculating a volume $V_2$ in liters after dilution to which the plant organic must be increased by using equation (1)

$$V_2 = D*V_1 \qquad (1)$$

wherein $V_1$ stands for the volume of plant organic;
(vi) adding a sufficient volume of oxime (a) and diluent (c) to be effectively equivalent to adding a volume of organic phase equal to $V_2-V_1$ having a Cu ML equivalent to the plant organic;
(viii) repeating (i) to (vi) as necessary.

Various embodiments are listed below. It will be understood that the embodiments listed below may be combined not only as listed below, but in other suitable combinations in accordance with the scope of the invention.

In embodiment one, said ketoxime is an orthohydroxyarylketoxime of formula (I)

$$R^1R^2C=NOH \qquad (I),$$

wherein $R^1$ is an hydrocarbyl group and $R^2$ is an optionally substituted ortho-hydroxyaryl group, and salts thereof. In a further embodiment, the orthohydroxyarylketoxime is substituted.

Embodiment two includes a modification wherein said aldoxime comprises an orthohydroxyarylaldoxime of formula (II)

$$R^3CHNOH \qquad (II)$$

wherein $R^3$ is an ortho-hydroxyaryl group, and salts thereof. In a further embodiment, the ortho-hydroxyaryl group are substituted.

Embodiment three is directed to a modification wherein said orthohydroxyarylketoxime is a 5-($C_8$-$C_{14}$ alkyl)-2-hydroxyacetophenone oxime, and in a further embodiment a 5-($C_9$-$C_{12}$ alkyl)-2-hydroxyacetophenone oxime, and in an even further embodiment, 5-nonyl-2-hydroxyacetophenone oxime.

A fourth embodiment relates to wherein said orthohydroxyarylaldoxime is a 5-($C_8$-$C_{14}$ alkyl)-2-hydroxybenzaldoxime, and in further embodiments a 5-($C_9$-$C_{12}$ alkyl)-2-hydroxybenzaldoxime, and in even further embodiments 5-nonyl-2-hydroxybenzaldoxime.

In a fifth embodiment, said equilibrium modifiers are more chemically stable than the oxime, and have both volatility and water solubility similar to that of the oxime.

In embodiment six, said equilibrium modifiers are selected from the group consisting of alkylphenols, alcohols, esters, ethers and polyethers, carbonates, ketones, nitriles, amides, carbamates, sulphoxides, and salts of amines and quaternary ammonium compounds.

In a seventh embodiment, said equilibrium modifiers are selected from the group consisting of 2,2,4-trimethyl-1,3-pentanediol di-isobutyrate, 2,2,4-trimethyl-1,3-pentanediol di-benzoate, di-butyl adipate, di-pentyl adipate, di-hexyl adipate and their mixtures.

In an eighth embodiment, said equilibrium modifiers are present in an amount that provides a degree of modification of the oximes present of from about 0.2 to 0.61.

In embodiment nine, said diluents are selected from the group consisting of hydrocarbon solvents which include aliphatic, alicyclic and aromatic hydrocarbons and mixtures thereof.

Embodiment ten relates to where said diluents having low aromatics content include solvents and solvent mixtures where the amount of aromatic hydrocarbons present in the organic solvent is less than 30%.

Embodiment 11 is an embodiment wherein said extraction circuits contain said reagents in concentrations from 5% v/v to 50% v/v.

A second aspect of the invention relates to a method for maintaining a ratio of oxime to equilibrium modifier concentration in solvent extraction circuits, wherein the solvent extraction circuit includes a plant organic comprising a solvent consisting essentially of
(a) at least one ketoxime and/or aldoxime;
(b) at least one equilibrium modifier; and
(c) at least one diluent.

The method comprises:
(i) taking a sample of the plant organic, determining the concentrations of each of the components (a) and (b) in the plant organic and a copper max load of the plant organic;
(ii) preparing a set of samples comprising said component (a) in (c) to give a copper max load equivalent to that of the plant organic containing varying levels of (b), determining a respective equilibrated strip point of each solution and plotting a curve of concentration of component (b) versus equilibrated strip point in order to create a calibration curve;
(iii) preparing a solution of fresh reagent in component (c) having a copper max load equivalent to that of the plant organic and determining its equilibrated strip point:
(iv) determining a desired concentration of component (b), DM, from the calibration curve using the equilibrated strip point for the fresh reagent;
(v) determining a factor F by which the plant organic volume must be increased to bring the level of component (b) to the desired level by using equation (1)

$$F = PM/DM \qquad (1)$$

whereby PM is the plant level of modifier and DM is the desired level of modifier;
(vi) calculating a volume $V_2$ after dilution to which the plant organic must be increased by using equation (2)

$$V_2 = F*V_1 \qquad (2)$$

wherein $V_1$ stands for the volume of plant organic;

(vii) adding a sufficient volume of oxime (a) and diluent (c) to be effectively equivalent to adding a volume of organic phase equal to $V_2-V_1$ having a Cu ML equivalent to the plant organic;

(viii) repeating (i) to (vii) as necessary.

There are similar variants for the aspect as with the first aspect described above. For example, in a first embodiment, said orthohydroxyarylketoxime is a 5-($C_8$-$C_{14}$ alkyl)-2-hydroxyacetophenone oxime, or more specifically a 5-($C_9$-$C_{12}$ alkyl)-2-hydroxyacetophenone oxime, or even more specifically 5-nonyl-2-hydroxyacetophenone oxime.

In a second embodiment, said orthohydroxyarylaldoxime is a 5-($C_8$-$C_{14}$ alkyl)-2-hydroxybenzaldoxime, or more specifically a 5-($C_9$-$C_{12}$ alkyl)-2-hydroxybenzaldoxime, or even more specifically 5-nonyl-2-hydroxybenzaldoxime.

In a third embodiment, said equilibrium modifiers are more chemically stable than the oxime, and have both volatility and water solubility similar to that of the oxime.

A fourth embodiment is directed to wherein said equilibrium modifiers are selected from the group consisting of alkylphenols, alcohols, esters, ethers and polyethers, carbonates, ketones, nitriles, amides, carbamates, sulphoxides, and salts of amines and quaternary ammonium compounds.

In embodiment five, said equilibrium modifiers are selected from the group consisting of 2,2,4-trimethyl-1,3-pentanediol di-isobutyrate, 2,2,4-trimethyl-1,3-pentanediol di-benzoate, di-butyl adipate, di-pentyl adipate, di-hexyl adipate and their mixtures.

In a sixth embodiment, said equilibrium modifiers are present in an amount that provides a degree of modification of the oximes present of from about 0.2 to 0.61.

In a seventh embodiment said diluents are selected from the group consisting of hydrocarbon solvents which include aliphatic, alicyclic and aromatic hydrocarbons and mixtures thereof.

DETAILED DESCRIPTION

Figure 1:
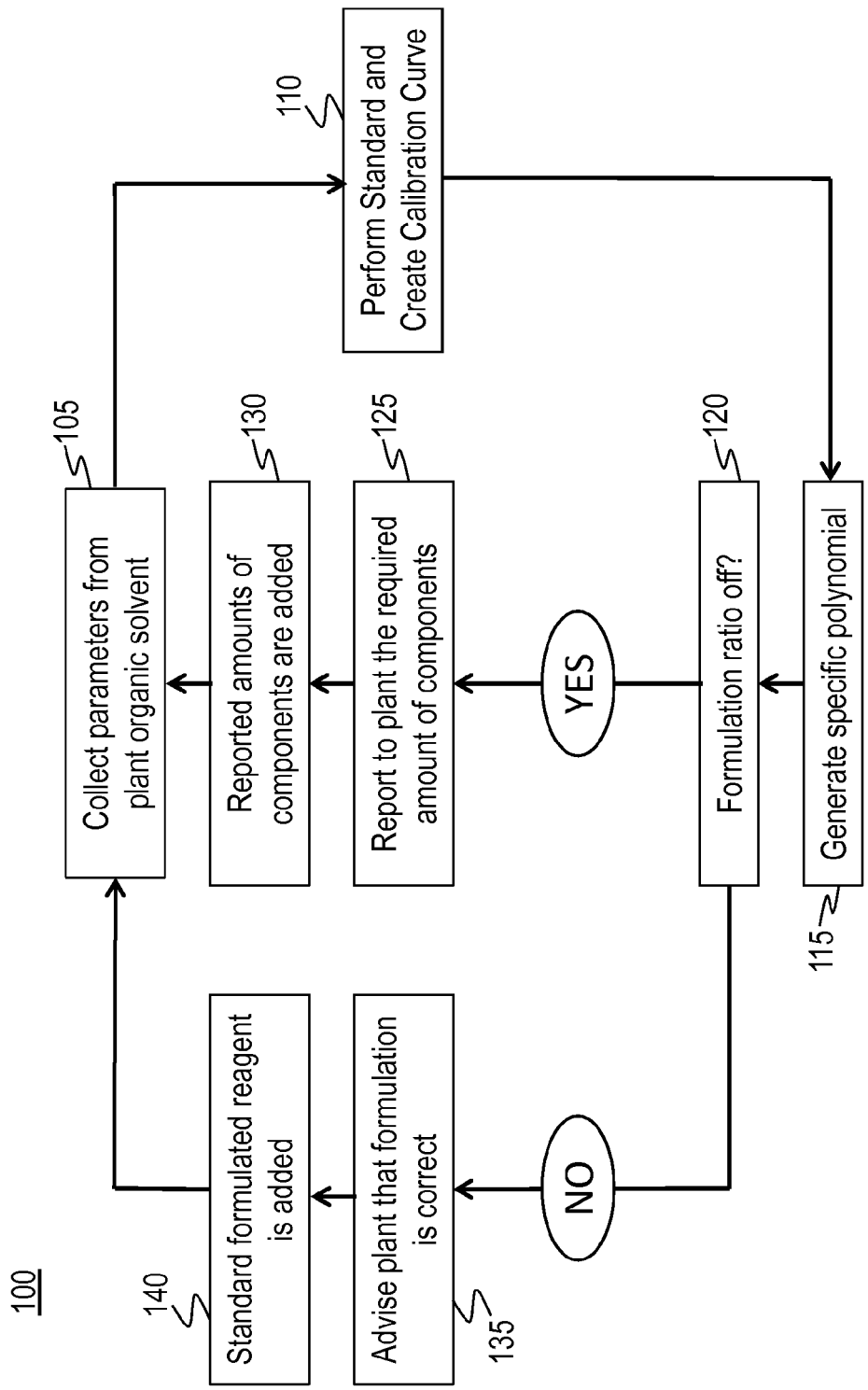
FIG. 1 is a flow diagram showing a method in accordance with one or more embodiments of the present invention.

A first aspect of the invention relates to methods for maintaining the ratio of the oxime to equilibrium modifier concentration in the circuit organic over time at the same ratio as in the fresh reagent specified for the application while maintaining the effective reagent concentration in the desired range.

In its first embodiment the object of the present invention is a method for maintaining the ratio of the oxime to equilibrium modifier concentration in solvent extraction circuits, said solvents essentially consisting of
  (a) at least one ketoxime and/or aldoxime;
  (b) at least one equilibrium modifier; and
  (c) at least one diluent;
  comprising the following steps:
(i) taking a sample of the plant organic, determining the copper max load and equilibrated strip point of the plant organic;
(ii) preparing a solution A of said component (a) in (c) to give a copper max load equivalent to that of the circuit organic, diluting small portions of the plant organic with solution A, determining the respective equilibrated strip point of each diluted solution and graphing the equilibrated strip point versus the degree of dilution of the circuit organic, where the degree of dilution of the plant organic is taken as 1, to create a calibration curve;
(iii) preparing a solution of the fresh reagent in component (c) having a copper max load (CuML) equivalent to that of the plant circuit organic and determining its equilibrated strip point (EqSP1);
(iv) determining the required dilution factor, D, by extrapolation from the graph using the equilibrated strip point for the fresh organic (EqSP1);
(v) calculating the volume $V_2$ in liters after dilution to which the circuit organic must be increased by using equation (1)

$$V_2=D*V_1 \qquad (1)$$

whereby $V_1$ stands for the volume of circuit organic in liters;
(vi) adding sufficient volume of oxime (a) and diluent (c) to be effectively equivalent to adding a volume of organic phase equal to $V_2-V_1$ having a Cu ML equivalent to the circuit organic;
(viii) repeating steps (i) to (vi) as necessary.

In the alternative, representing the second embodiment of the invention refers to a similar method for maintaining the ratio of the oxime to equilibrium modifier concentration in solvent extraction circuits, said solvents essentially consisting of
  (a) at least one ketoxime and/or aldoxime;
  (b) at least one equilibrium modifier; and
  (c) at least one diluent;
  comprising the following steps:
(i) taking a sample of the plant organic, determining the concentrations of each of the components (a) and (b) in the plant organic, the copper max load and equilibrated strip point of the plant organic;
(ii) preparing an artificial set of samples comprising said component (a) in (c) to give a copper max load equivalent to that of the circuit organic containing varying levels of (b), determining the respective equilibrated strip point of each solution and plotting a curve of concentration of component (b) versus equilibrated strip point in order to create a calibration curve;
(iii) preparing a solution of the fresh reagent in component (c) having a copper max load equivalent to that of the circuit organic and determining its equilibrated strip point:
(iv) determining the desired concentration of component (b), DM, from the calibration curve using the equilibrated strip point for the fresh organic;
(v) determining the factor F by which the plant circuit organic volume must be increased to bring the level of component (b) to the desired level by using equation (1)

$$F=PM/DM \qquad (1)$$

whereby PM is the plant level of modifier and DM is the desired level of modifier;
(vi) calculating the volume $V_2$ in liters after dilution to which the circuit organic must be increased by using equation (2)

$$V_2=F*V_1 \qquad (2)$$

whereby $V_1$ stands for the volume of circuit organic in liters;
(vii) adding sufficient volume of oxime (a) and diluent (c) to be effectively equivalent to adding a volume of organic phase equal to $V_2-V_1$ having a Cu ML equivalent to the circuit organic;
(viii) repeating steps (i) to (vii) as necessary.

The present invention provides a fast and accurate method to determine the amounts of the components that must be added to maintain the extractant composition in the circuit organic equivalent to that of the extractant required for the application. The methodology is particular useful for reagent concentrations of commercial formulated reagents from 5% v/v to 50% v/v, more preferably from 5% v/v to 40% v/v, and most preferred from 10% v/v to 40% v/v.)

The overall process is reflected in FIG. 1, which shows a flow chart of the method 100. In the first step, the relevant parameters from the plant organic (concentration of the constituents) are collected 105. Then a calibration curve is prepared 110, and specific polynomial generated 115 in order to determine whether the plant is operated under optimal conditions or outside 120. If the equilibrated strip point of a solution of fresh reagent having a copper max load equivalent to that of the plant organic is same as that of the plant organic, one can report back to the plant operator that the formulation is proper 135 and a standard formulation reagent is added 140 in order to compensate for the standard losses by degradation and entrainment. If the equilibrated strip point is lower than that of the corresponding fresh reagent solution, one can determine the amounts of oxime and diluent and report the operator 125 how to adjust the composition of the extractant in the plant organic back to optimal proportions. Then, these reported amounts of components can be added 130. In either situation, the process then can begin anew with collection of parameters from the plant organic solvent 105.

Although it is basically possible to add neat oxime and neat diluent to the extraction circuit to bring back the reagents to equilibrium conditions, it preferred to add formulated reagent which is by far easier to handle. The amount of neat oxime can be calculated according to equation (3)

$$A(Oxime) = (V_2 - V_1) * \left[ \frac{CuML}{63.5} * 2 \right] * MW \quad (3)$$

in which CuML stands for the Cu max load of circuit organic and MW for the molecular weight of the respective oxime; 63.5 is the atomic weight of copper. ([CuML/63.5]*2)=the number of moles per liter of oxime required to give a solution having the same CuML as current circuit organic. The volume in liters of neat oxime added ($V_3$) would be equal to A divided by the density which is approximately 1000 g/liter. The difference ($V_2-V_1$)–$V_3$ would be the volume of component (c) required.

In case a mixture of oximes is involved, one would have to add in an additional factor. Assuming that the circuit contains a mixture of ketoxime and aldoxime, than the concentration of ketoxime is [K] and the concentration of aldoxime is [A]. The amount of ketoxime required the equation (3a) would be:

$$A(K'Oxime) = \\ (V_2 - V_1) * \left[ \frac{CuML}{63.5} * 2 \right] * \{[K]/[K] + [Al]\} * MW \text{ of ketoxime} \quad (3a)$$

For the amount of aldoxime required the equation (3b) would be:

$$A(A'Oxime) = \\ (V_2 - V_1) * \left[ \frac{CuML}{63.5} * 2 \right] * \{[Al]/[K] + [Al]\} * MW \text{ of aldoxime} \quad (3b)$$

The density of the neat oximes are the same therefore one can simply calculate the volume of each, sum the total volume contributions of the oximes and calculate the required volume of component (c) as described above.

Organic Extractants

Organic extractants for extraction of various metals in particular copper from leach solutions derived from leaching of ores typically comprise aldoximes, ketoximes and their mixtures, particularly so-called orthohydroxyarylketoximes and orthohydroxyarylaldoximes.

The orthohydroxyarylketoxime compounds employed in the present invention are substantially water insoluble and preferably have the formula (I)

$$R^1R^2C{=}NOH \quad (I)$$

wherein
$R^1$ is an optionally substituted hydrocarbyl group
$R^2$ is an optionally substituted ortho-hydroxyaryl group, and salts thereof.

The orthohydroxyarylaldoxime compounds employed in the present invention are substantially water insoluble and preferably have the formula (II)

$$R^3CHNOH \quad (II)$$

wherein
$R^3$ is an optionally substituted ortho-hydroxyaryl group, and salts thereof.

Whilst the invention is described herein with reference to compounds of formulae (I) and (II), it is understood that it relates to said compound in any possible tautomeric forms, and also the complexes formed between orthohydroxyarylaldoximes or orthohydroxyarylketoximes and metals, particularly copper. Optionally substituted hydrocarbyl groups which may be represented by $R^1$ preferably comprise optionally substituted alkyl and aryl groups including combinations of these, such as optionally substituted aralkyl and alkaryl groups.

Examples of optionally substituted alkyl groups which may be represented by $R^1$ include groups in which the alkyl moieties can contain from 1 to 20, especially from 1 to 4, carbon atoms. A preferred orthohydroxyarylketoxime is one in which $R^1$ is alkyl, preferably containing up to 20, and especially up to 10, and more preferably up to 3 saturated aliphatic carbon atoms, and most preferably $R^1$ is a methyl group. Examples of optionally substituted aryl groups which may be represented by $R^1$ include optionally substituted phenyl groups. When $R^1$ is an aryl group, it is preferably an unsubstituted phenyl group.

When any of $R^1$, $R^2$ or $R^3$ is substituted, the substituent(s) should be such as not to affect adversely the ability of the orthohydroxyarylaldoxime or orthohydroxyarylketoxime to complex with metals, especially copper. Suitable substituents include halogen, nitro, cyano, hydrocarbyl, such as $C_1$-$C_{20}$ alkyl, especially $C_1$-$C_{10}$ alkyl; hydrocarbyloxy, such as $C_1$-$C_{20}$ alkoxy, especially $C_1$-$C_{10}$ alkoxy; hydrocarbyloxycarbonyl, such as $C_1$-$C_{20}$ alkoxycarbonyl, especially $C_1$-$C_{10}$ alkoxycarbonyl; acyl, such as $C_1$-$C_{20}$ alkylcarbonyl and arylcarbonyl, especially $C_1$-$C_{10}$ alkylcarbonyl and phenylcarbonyl; and acyloxy, such as $C_1$-$C_{20}$ alkylcarbonyloxy and arylcarbonyloxy, especially $C_1$-$C_{10}$ alkylcarbonyloxy and phenylcarbonyloxy. There may be more than one substituent in which case the substituents may be the same or different.

In one or more embodiments, the orthohydroxyarylketoxime is a 5-($C_8$-$C_{14}$ alkyl)-2-hydroxyacetophenone oxime, more often a 5-($C_9$-$C_{12}$ alkyl)-2-hydroxyacetophenone oxime, and particularly 5-nonyl-2-hydroxyacetophenone oxime. In one or more embodiments, the orthohydroxyarylaldoxime is a 5-($C_8$-$C_{14}$ alkyl)-2-hydroxybenzaldoxime, more often a 5-($C_9$-$C_{12}$ alkyl)-2-hydroxybenzaldoxime, and particularly 5-nonyl-2-hydroxybenzaldoxime.

The compositions may often comprise more than one different orthohydroxyarylaldoximes and/or more than one different orthohydroxyarylketoximes in which the nature of the substituent groups represented by $R^1$ and $R^2$ differ between component orthohydroxyarylketoximes and/or the substituent groups represented by $R^3$ differ between component orthohydroxyarylaldoximes, especially where the component orthohydroxyarylaldoximes and/or orthohydroxyarylketoximes are isomeric. Such isomeric mixtures may have better solubility in organic solvents than when a single orthohydroxyarylketoxime and a single orthohydroxyarylaldoxime are present.

Often, the total amount of orthohydroxyarylaldoxime and orthohydroxyarylketoxime in the organic phase comprises at least 1% b.w., commonly at least 2.5% b.w. and usually at least 5% b.w. of composition, and preferably comprises from 7.5 to 30% b.w., most preferably comprises from about 7.5 to 25% b.w., such as about 10% b.w. of the composition.

Equilibrium Modifiers

Equilibrium modifiers employed in the present invention are significantly more chemically stable than the oxime, have both volatility and water solubility similar to that of the oxime. Suitable equilibrium modifiers fulfilling these conditions can be alkyl phenols, alcohols, esters, ethers and polyethers, carbonates, ketones, nitriles, amides, carbamates, sulphoxides, and salts of amines and quaternary ammonium compounds.

Alkyl phenols which may be used as modifiers in conjunction with the extractant include alkyl phenols containing from 3 to 15 alkyl carbon atoms, for example 4-tert-butylphenol, 4-heptylphenol, 5-methyl-4-pentylphenol, 2-chloro-4-nonylphenol, 2-cyano-4-nonylphenol, 4-dodecylphenol, 3-pentadecylphenol and 4-nonylphenol and mixtures thereof. The preferred phenols contain alkyl groups having from 4 to 12 carbon atoms, especially the mixed 4-nonylphenols obtained by condensation of phenol and propylene trimer.

Alcohols which may be used as modifiers in conjunction with the extractant include saturated and unsaturated hydrocarbon alcohols and polyols containing 14 to 30, preferably 15 to 25 carbon atoms. The alcohols are preferably highly branched with the hydroxyl group located approximately midway along the hydrocarbon backbone. Especially preferred are the branched chain alcohols that may be made by condensation of short chain alcohols by the Guerbet process, such alcohols sometimes being referred to as Guerbet alcohols. Optionally, the alcohols may contain an aromatic group or other functional group, particularly an ester group. Especially useful alcohols may be synthesized from highly branched precursors leading to very highly branched Guerbet alcohols containing a large number of terminal methyl groups. Examples of particularly efficient alcohol modifiers include highly branched isohexadecyl alcohol and iso-octadecyl alcohol, the latter being 2-(1,3,3-trimethylbutyl)-5,7,7-trimethyloctan-1-ol.

Esters which may be used as modifiers in conjunction with the extractant include saturated and unsaturated aliphatic and aromatic-aliphatic esters containing from 10 to 30 carbon atoms. The esters may be mono-esters or polyesters, especially di-esters. The esters are preferably highly branched. Optionally, the esters may contain other functional groups, particularly a hydroxyl group or ether group. Where the ester is a product of the reaction of an alcohol and a mono-carboxylic acid, it is preferred that the alcohol is an alkyl alcohol and comprises from 1 to 6 carbon atoms, and the mono-carboxylic acid comprise from 2 to 16 carbon atoms. Where the ester is a product of the reaction of an alcohol and a di-carboxylic acid, it is preferred that the alcohol is an alkyl alcohol and comprises from 1 to 6 carbon atoms, and the di-carboxylic acid comprises from 4 to 12 carbon atoms. Where the ester is a product of the reaction of a diol and a mono-carboxylic acid, it is preferred that the diol is an alkyl diol and comprises from up to 6 carbon atoms, and the mono-carboxylic acid comprises from 6 to 16 carbon atoms. Where the ester is a tri-alkyl phosphate, the alkyl groups each commonly comprise from 4 to 14 carbon atoms. Examples of useful esters include isodecyl acetate, methyl decanoate, 2-pentyl octanoate, n-hexyl hexanoate, methly isooctanoate, 1,4-butanediol dihexanoate, di-butyl adipate, di-isobutyl adipate, di-pentyl adipate, di-hexyl adipate, bis-2-ethoxyethyl adipate, dipropylene glycol dibenzoate, propylene glycol dibenzoate, tributyl phospate, trioctyiphosphate, triethylhexylphosphate, 2,2,4-trimethyl-1,3-pentanediol mono-isobutyrate (TXIB), 2,2,4-trimethyl-1,3-pentanediol mono-benzoate and particularly 2,2,4-trimethyl-1,3-pentanediol di-isobutyrate and 2,2,4-trimethyl-1,3-pentanediol di-benzoate.

Ethers which may be used as modifiers in conjunction with the extractant include hydrocarbon ethers and polyethers containing 12 to 30, preferably 15 to 25 carbon atoms. Examples of useful ethers and polyethers include benzyl 2-(2-butoxyethoxy)ethyl ether and benzyl 2-butoxyethyl ether. Suitable ethers are disclosed in WO 2008/088473 A2 (Cognis) which are hereby incorporated by reference.

Carbonates which may be used as modifiers in conjunction with the extractant include carbonates containing from 4 to 16 carbon atoms. Commonly, the carbonates are alkyl carbonates. Examples of useful carbonates include isobutylcarbonate, isotridecylcarbonate and a carbonate mixture comprising a mixture of C 8 and C 10 alkyl groups.

Ketones which may be used as modifiers in conjunction with the extractant include alkyl ketones in which the alkyl group contains from 1 to 20 carbon atoms. Examples of useful ketones include isobutyl heptylketone, nonanone, 2,6,8-trimethyl-4-nonanone, diundecyl ketone and 5,8-diethyldodecane-6,7-dione.

Nitriles which may be used as modifiers in conjunction with the extractant include aliphatic and araliphatic hydrocarbonitriles which comprise from 10 to 36 carbon atoms. Examples of useful nitrites include undecylnitrile and oleonitrile.

Amides which may be used as modifiers in conjunction with the extractant include amides containing from 8 to 20 carbon atoms. Amides comprise products which may be derived from the reaction of a primary or secondary amine with a mono- or di carboxylate acid or equivalent, in particular phosgene or equivalents. Examples of useful amides include N,N'-bis-2-ethylhexyl urea, N,N'-bis-2-ethylhexyl 2-ethylhexanamide, N-hexyl 2-ethylhexanamide, N,N'-dibutyl benzamide, N,N'-dibutyl octanamide, N,N'-dimethyl octanamide and N,N'-bis-2-ethylhexyl versatamide.

Carbamates which may be used as modifiers in conjunction with the extractant include alkyl and aryl carbamates. Examples of useful carbamates include N-octyl isotridecylcarbamate and isotridecyl N-tolylcarbamate.

Sulphoxides which may be used as modifiers in conjunction with the extractant include alkyl sulphoxides. An example of a useful sulphoxide is di-2-ethylhexyl sulphoxide.

Salts of amines and quaternary ammonium compounds which may be used as modifiers in conjunction with the extractant include tertiary amines and quaternary ammonium compounds containing alkyl groups having from 8 to 18 carbon atoms and sulphonic acid salts thereof. Examples of sulphonic acids include dinonyinapthalene sulphonic acid and toluene sulphonic acid.

In the context of the present invention, 'highly branched' as applied to the alcohols and esters means that the ratio of the number of methyl carbon atoms to non-methyl carbon atoms is higher than 1:5 and preferably higher than 1:3. If desired, mixtures of compounds selected from the group consisting of alkyl phenols, alcohols, esters, ethers, polyethers, carbonates, ketones, nitriles, amides, carbamates, sulphoxides, and salts of amines and quaternary ammonium compounds may be employed as modifiers. Particularly preferred are mixtures comprising a first compound selected from the group consisting of alkylphenols, alcohols, esters, ethers, polyethers, carbonates, ketones, nitriles, amides, carbamates, sulphoxides, and salts of amines and quaternary ammonium compounds and a second compound selected from the group consisting of alkanols having from 6 to 18 carbon atoms, an alkyl phenol in which the alkyl group contains from 7 to 12 carbon atoms, and tributylphosphate.

Preferably one or more equilibrium modifiers selected from 2,2,4-trimethyl-1,3-pentanediol mono-isobutyrate, 2,2,4-trimethyl-1,3-pentanediol mono-benzoate, 2,2,4-trimethyl-1,3-pentanediol di-isobutyrate, 2,2,4-trimethyl-1,3-pentanediol di-benzoate, di-butyl adipate, di-pentyl adipate, di-hexyl adipate, isobutyl heptyl ketone, nonanone, 2,6,8-trimethyl-4-nonanone, diundecyl ketone, 5,8-diethyldodecane-6,7-dione, tridecanol, and nonyl phenol are employed. One or more equilibrium modifiers are present in an amount that provides a degree of modification of the oximes, in particular the orthohydroxyarylaldoximes present of from about 0.2 to 0.70 more preferably from about 0.3 to 0.70, and most preferably from about 0.4 to 0.65.

As employed herein, "degree of modification" designates the inverse ratio of (a) the stripped solvent copper level of an hydroxy aryl aldoxime extractant at equilibrium (expressed in terms of grams per liter of copper) extracted with an aqueous solution containing a fixed concentration of copper and sulfuric acid to (b) the stripped solvent copper level of the same extractant under the same conditions when a selected equilibrium modifier additive is present. Consistent with this definition, the presence of relatively small quantities of an equilibrium modifier will shift the extraction equilibrium slightly, resulting in minor diminution of aldoxime stripped solvent copper level at equilibrium, as will be reflected by a degree of modification value closely approaching 1.0, e.g., 0.99. Increased effective quantities of modifier under otherwise identical conditions will result in a more pronounced shift in extraction equilibrium and a more pronounced diminution of aldoxime stripped solvent copper level at equilibrium, as will be reflected by a degree of modification corresponding less than 1.0.

Expectedly, the degree of modification resulting from a given molar ratio of equilibrium modifier to aldoxime in a reagent will vary depending on such factors as the degree of purity of the extractant composition employed in formulation of the reagent, the aromaticity of the solvent, and, perhaps most significantly, the chemical identity of the equilibrium modifier employed. It will also depend significantly on the conditions involved in determination of stripped solvent copper levels. Consequently, for purposes of determining degree of modification of an aldoxime by a given equilibrium modifier, the following test conditions should be adhered to. The temperature at which the determination is made should be about 24° C. The molar concentration of aldoxime (or mixture of aldoximes) in the diluent should be about 0.184 as determined by copper loading and titration and an aldoxime stock of approximately 94% purity (with the remainder being substantially alkyl phenol starting material residue) should be employed. The diluent should be ESCAID® 100 or a mixture of aliphatic and aromatic hydrocarbons closely approximating the constitution of ESCAID® 100. An atomic absorption methodology should be employed for determining copper content. The composition of the strip solution should be preferably 150 g/L sulphuric acid and 30 g/L $Cu^{2+}$.

The foregoing conditions are employed in determining degree of modification according to the invention because they represent conditions closely resembling those commonly extant in commercial solvent extraction facilities for recovery of for example of copper.

Diluents

Organic solvents which may be present in the composition include any mobile organic solvent, or mixture of solvents, which is immiscible with water and is inert under the extraction conditions to the other materials present. Preferably the organic solvent has low aromatic hydrocarbon content. Preferred organic solvents are hydrocarbon solvents which include aliphatic, alicyclic and aromatic hydrocarbons and mixtures thereof as well as chlorinated hydrocarbons such as trichloroethylene, perchloroethylene, trichloroethane and chloroform. Highly preferred organic solvents having low aromatics content include solvents and solvent mixtures where the amount of aromatic hydrocarbons present in the organic solvent is less than 30%, usually around 23% or less, often less than 5%, and frequently less than 1%.

Examples of suitable hydrocarbon solvents include ESCAID® 110, ESCAID® 115, ESCAID® 120, ESCAID® 200, and ESCAID® 300 commercially available from ExxonMobil Chemical Company, SHELLSOL® D70 and D80 300 commercially available from Shell Chemical Company, and CONOSOL® 170 commercially available from ConocoPhillips. Suitable solvents are hydrocarbon solvents include high flash point solvents and solvents with a high aromatic content such as SOLVESSO® 150 commercially available from ExxonMobil Chemical Company. More preferred are solvents with a low aromatic content. Certain suitable solvents with a low aromatic content, have aromatic contents of 1% w/w, for example, hydrocarbon solvents such as ESCAID® 110 commercially available from ExxonMobil Chemical Company, and ORFOM® SX 10 and ORFOM SX11 commercially available from Chevron Phillips Chemical Company. Especially preferred, however on grounds of low toxicity and wide availability, are hydrocarbon solvents of relatively low aromatic content such as kerosene, for example ESCAID® 100 which is a petroleum distillate with a total aromatic content of 23% commercially available from ExxonMobil Chemical Company or ORFOM® SX7, commercially available from Chevron Phillips Chemical Company.

EXAMPLES

Example 1

A sample of a plant organic was obtained from an operating mine-site solvent extraction plant. The copper max load of the plant organic (PO) was determined using the method described in the documentation Cognis Blue Line: Determination of reagent concentration in an organic phase (available from Cognis Corp., 2430 North Huachuca Drive, Tucson, Ariz. (US) Relevant is the version issued June 2002). The copper max load was 11.2 gpl which was equivalent to 20% v/v of fresh reagent. The equilibrated strip point was determined using the methodology described in the documentation Cognis Blue Line: Cognis Equilibrium Strip Point. The equilibrated strip point was 2.94 gpl Cu. The reagent being supplied to the plant was a modified $C_9$ aldoxime which was formulated to give a copper max load of 0.56 gpl Cu/% v/v under standard conditions. A solution of the reagent as supplied was prepared by placing 20 ml of reagent in a 100 ml volumetric flask and diluting to the mark with the plant solvent. The Cu max load was determined in the same fashion as before. It was 11.2 gpl, the same as plant organic. The equilibrated strip point was determined to be 3.25 gpl Cu. Comparison of the equilibrated strip point data suggests that the ratio of modifier to aldoxime in the circuit organic is out of balance relative to that in the fresh reagent being added to the circuit. The plant organic is behaving effectively as a weaker extractant than targeted for operation. Additional oxime and diluent must be added to the circuit to bring the oxime and modifier back into the desired ratio.

To determine the amount of oxime and diluent that must be added to the plant organic to maintain the desired Cu max load, one must first establish a graph of equilibrated strip point versus dilution factor. A solution (A) of $C_9$ aldoxime was prepared in plant solvent and the concentration adjusted so that the copper max load was 11.2 gpl Cu. Examples of non-modified aldoxime reagents that could be used are LIX 860N-I or LIX 860N-IC. The Cu max load factor for LIX 860N-I is 0.56 gpl cu/% v/v and that of LIX 860N-IC is 0.78 gpl Cu/% v/v.

A series of solutions were prepared by diluting plant organic with A and the equilibrated strip point was determined for each. The results are summarized in Table 1:

TABLE 1

| Volume of PO (ml) | Volume of A (ml) | Dilution Factor | Eq Strip Point (gpl Cu) |
|---|---|---|---|
| 100 | 0 | 1.0 | 2.94 |
| 100 | 5 | 1.05 | 3.06 |
| 100 | 10 | 1.10 | 3.16 |
| 100 | 15 | 1.15 | 3.25 |
| 100 | 20 | 1.20 | 3.38 |
| 100 | 25 | 1.25 | 3.44 |

Figure 2:
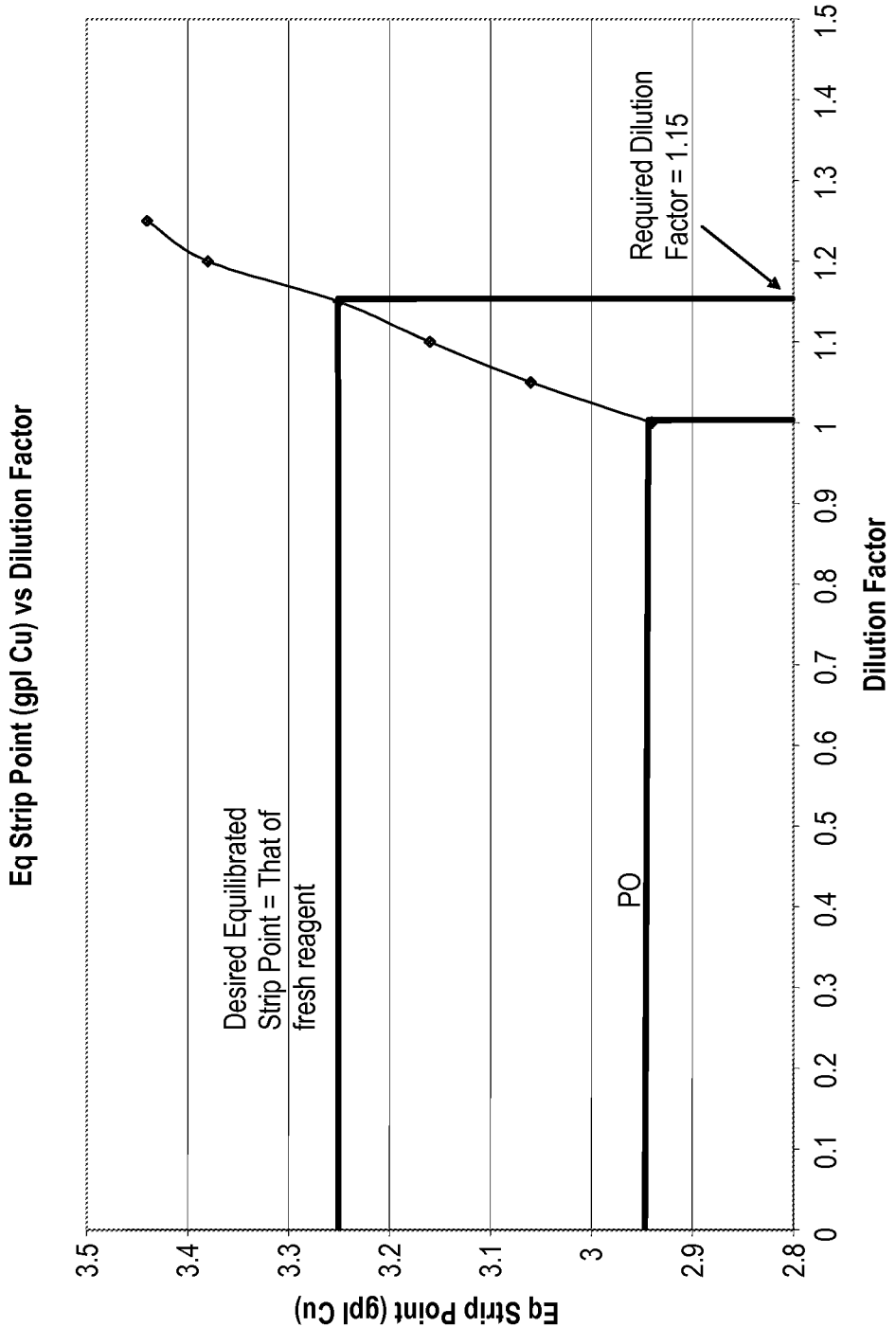
FIG. 2 is a graph showing the equilibrium strip point in grams per liter copper versus dilution factor in accordance with one or more embodiments of the invention.

The data is plotted in the following graph and the required dilution factor is determined by extrapolating for the dilution factor equivalent to the equilibrated strip point of the fresh reagent that is being added into the plant (see FIG. 2)

The plant circuit inventory consists of 400,000 liters of PO. Multiplying the circuit inventory by the dilution factor gives you a total of 400,000 liters times 1.15 which equals a total of 460,000 liters. A total of 60,000 liters (460,000–400,000) of fresh organic consisting of aldoxime and plant solvent must be added to the PO to bring the oxime to modifier ratio into balance. Since the Cu max load factor for LIX 860N-I is the same as that of the fresh reagent being used in the plant, you need to add the equivalent of 20% v/v of LIX 860N-I in solvent or 12,000 liters of LIX 860N-I and 48,000 liters of fresh diluent.

The invention claimed is:

1. A method for maintaining a ratio of oxime to equilibrium modifier concentration in solvent extraction circuits, wherein the solvent extraction circuit includes a plant organic comprising a solvent consisting essentially of
    (a) at least one ketoxime and/or aldoxime;
    (b) at least one equilibrium modifier; and
    (c) at least one diluent;
    the method comprising:
    (i) taking a sample of the plant organic, determining a copper max load and an equilibrated strip point of the plant organic;
    (ii) preparing a solution A comprising (a) and (c) to give a copper max load equivalent to that of the plant organic, diluting small portions of the plant organic with solution A to provide a plurality of diluted solutions, determining an equilibrated strip point of each diluted solution and graphing the equilibrated strip point versus the degree of dilution of the plant organic, wherein the degree of dilution of the plant organic is taken as 1, to create a calibration curve;
    (iii) preparing a solution of a fresh reagent composition comprising (a), (b) and (c) having a copper max load (CuML) equivalent to that of the plant organic and determining its equilibrated strip point (EqSP1);
    (iv) determining a required dilution factor, D, by selecting a point on the calibration curve having an equilibrated strip point equal to the equilibrated strip point (EqSP1) for the fresh reagent composition and finding the corresponding degree of dilution;
    (v) calculating a volume $V_2$ in liters after dilution to which the plant organic must be increased by using equation (1)

$$V_2 = D * V_1 \quad (1)$$

wherein $V_1$ stands for the volume of plant organic;
    (vi) adding a sufficient volume of oxime (a) and diluent (c) to the plant organic to be effectively equivalent to adding a volume of organic phase equal to $V_2-V_1$ having a Cu ML equivalent to the plant organic;
    (vii) repeating (i) to (vi) as necessary.

2. The method of claim 1, wherein said ketoxime is an orthohydroxyarylketoxime of formula (I)

$$R^1R^2C=NOH \quad (I),$$

wherein $R^1$ is an optionally substituted hydrocarbyl group and $R^2$ is an optionally substituted ortho-hydroxyaryl group, and salts thereof.

3. The method of claim 1, wherein said aldoxime comprises an orthohydroxyarylaldoxime of formula (II)

$$R^3CHNOH \quad (II)$$

wherein $R^3$ is an optionally substituted ortho-hydroxyaryl group, and salts thereof.

4. The method of claim 2, wherein said orthohydroxyarylketoxime comprises a 5-($C_8$-$C_{14}$ alkyl)-2-hydroxyacetophenone oxime.

5. The method of claim 3, wherein said orthohydroxyarylaldoxime comprises a 5-($C_8$-$C_{14}$ alkyl)-2-hydroxybenzaldoxime.

6. The method of claim 1, wherein said equilibrium modifiers are selected from the group consisting of alkylphenols, alcohols, esters, ethers, polyethers, carbonates, ketones, nitriles, amides, carbamates, sulphoxides, salts of amines, and salts of quaternary ammonium compounds.

7. The method of claim 1, wherein said equilibrium modifiers are selected from the group consisting of 2,2,4-trimethyl-1,3-pentanediol di-isobutyrate, 2,2,4-trimethyl-1,3-pentanediol di-benzoate, di-butyl adipate, di-pentyl adipate, di-hexyl adipate and their mixtures.

8. The method of claim 1, wherein said equilibrium modifiers are present in an amount that provides a degree of modification of the oximes present of from about 0.2 to 0.61.

9. The method of claim 1, wherein said diluents are selected from the group consisting of aliphatic hydrocarbons, alicyclic hydrocarbons, aromatic hydrocarbons and mixtures thereof.

10. The method of claim 1, wherein said diluents include solvents and solvent mixtures having an amount of aromatic hydrocarbons less than 30% w/w.

11. The method of claim 1, wherein said extraction circuits contain said reagents in concentrations from 5% v/v to 50% v/v.

12. A method for maintaining a ratio of oxime to equilibrium modifier concentration in solvent extraction circuits, wherein the solvent extraction circuit includes a plant organic comprising a solvent consisting essentially of (a) at least one ketoxime and/or aldoxime;

(b) at least one equilibrium modifier; and (c) at least one diluent;

the method comprising:

(i) taking a sample of the plant organic, determining the concentrations of each of (a) and (b) in the plant organic and a copper max load of the plant organic;

(ii) preparing a set of sample solutions comprising (a), (b) and (c) to give a copper max load equivalent to that of the plant organic containing varying levels of (b), determining an equilibrated strip point of each sample solution and plotting a curve of concentration of (b) versus equilibrated strip point in order to create a calibration curve;

(iii) preparing a solution of a fresh reagent composition comprising (a), (b) and (c) having a copper max load equivalent to that of the plant organic and determining its equilibrated strip point;

(iv) determining a desired concentration of (b), DM, from the calibration curve by selecting a point on the calibration curve having an equilibrated strip point equal to the equilibrated strip point for the fresh reagent and finding the corresponding concentration of (b);

(v) determining a factor F by which the plant organic volume must be increased to bring the level of (b) to the desired concentration of (b) by using equation (1)

$$F=PM/DM \quad (1)$$

wherein PM is the concentration of (b) in the plant organic and DM is the desired concentration of (b);

(vi) calculating a volume $V_2$ after dilution to which the plant organic must be increased by using equation (2)

$$V_2=F*V_1 \quad (2)$$

wherein $V_1$ stands for the volume of plant organic;

(vii) adding a sufficient volume of oxime (a) and diluent (c) to the fresh reagent composition to be effectively equivalent to adding a volume of organic phase equal to $V_2-V_1$ having a copper max load (Cu ML) equivalent to the plant organic;

(viii) repeating (i) to (vii) as necessary.

13. The method of claim 12, wherein said ketoxime comprises an orthohydroxyarylketoxime.

14. The method of claim 12, wherein said aldoxime comprises an orthohydroxyarylaldoxime.

15. The method of claim 12, wherein said equilibrium modifiers are selected from the group consisting of alkylphenols, alcohols, esters, ethers, polyethers, carbonates, ketones, nitriles, amides, carbamates, sulphoxides, salts of amines, and salts of quaternary ammonium compounds.

16. The method of claim 12, wherein said equilibrium modifiers are selected from the group consisting of 2,2,4-trimethyl-1,3-pentanediol di-isobutyrate, 2,2,4-trimethyl-1,3-pentanediol di-benzoate, di-butyl adipate, di-pentyl adipate, di-hexyl adipate and their mixtures.

17. The method of claim 12, wherein said equilibrium modifiers are present in an amount that provides a degree of modification of the oximes present of from about 0.2 to 0.61.

18. The method of claim 12, wherein said diluents are selected from the group consisting of aliphatic hydrocarbons, alicyclic hydrocarbons, aromatic hydrocarbons and mixtures thereof.

19. The method of claim 13, wherein said orthohydroxyarylketoxime comprises a 5-($C_8$-$C_{14}$ alkyl)-2-hydroxyacetophenone oxime.

20. The method of claim 14, wherein said orthohydroxyarylaldoxime comprises 5-($C_8$-$C_{14}$ alkyl)-2-hydroxybenzaldoxime.

* * * * *